(12) United States Patent
Wu et al.

(10) Patent No.: US 9,663,670 B2
(45) Date of Patent: May 30, 2017

(54) WATER REMOVABLE COMPOSITIONS AND APPLICATIONS THEREOF

(71) Applicant: 3D Systems, Inc., Rock Hill, SC (US)

(72) Inventors: Bo Wu, Wilsonville, OR (US); Jule W. Thomas, Jr., West Linn, OR (US)

(73) Assignee: 3D Systems, Inc., Rock Hill, SC (US)

( * ) Notice: Subject to any disclaimer, the term of this patent is extended or adjusted under 35 U.S.C. 154(b) by 75 days.

(21) Appl. No.: 14/446,759

(22) Filed: Jul. 30, 2014

(65) Prior Publication Data

US 2016/0032116 A1    Feb. 4, 2016

(51) Int. Cl.
| | |
|---|---|
| C09D 11/34 | (2014.01) |
| C09D 11/36 | (2014.01) |
| C09D 11/12 | (2006.01) |
| C08K 5/23 | (2006.01) |
| B41M 5/00 | (2006.01) |
| C09D 11/102 | (2014.01) |
| C09D 11/328 | (2014.01) |
| B33Y 70/00 | (2015.01) |

(52) U.S. Cl.
CPC .............. *C09D 11/12* (2013.01); *B33Y 70/00* (2014.12); *B41M 5/0047* (2013.01); *B41M 5/0064* (2013.01); *C08K 5/23* (2013.01); *C09D 11/102* (2013.01); *C09D 11/328* (2013.01); *C09D 11/34* (2013.01)

(58) Field of Classification Search
CPC ................................ C09D 11/34; C09D 11/36
See application file for complete search history.

(56) References Cited

U.S. PATENT DOCUMENTS

| | | | | |
|---|---|---|---|---|
| 5,938,826 A | * | 8/1999 | Baker | C09D 11/34 106/31.29 |
| 6,001,904 A | | 12/1999 | Matzinger et al. | |
| 6,235,098 B1 | * | 5/2001 | Maekawa | C09D 11/34 106/31.61 |
| 6,590,082 B1 | | 7/2003 | Banning et al. | |
| 6,755,902 B2 | | 6/2004 | Banning et al. | |
| 2007/0119338 A1 | * | 5/2007 | Breton | C09D 7/1241 106/31.29 |
| 2010/0086683 A1 | | 4/2010 | Birau et al. | |
| 2012/0033008 A1 | | 2/2012 | Lin | |

FOREIGN PATENT DOCUMENTS

WO    2010003038    7/2010

OTHER PUBLICATIONS

PCT International Search Report the International Searching Authority for PCT/US2015/040293, mailed Oct. 7, 2015 (4 pages).
PCT Written Opinion of the International Searching Authority for PCT/US2015/033110, mailed Oct. 7, 2015 (6 pages).

* cited by examiner

*Primary Examiner* — Veronica F Faison

(57) ABSTRACT

In one aspect, water removable compositions are described herein, including for use in various printing applications. In some embodiments, a composition described herein comprises 50-95% by weight alcohol wax having the formula $CH_3(CH_2)_nOH$, wherein n is an integer from 15 to 40; 5-50% by weight tackifier; and 0.5-5% by weight colorant. In other instances, a composition described herein comprises 50-95% by weight carboxylic acid wax having the formula $CH_3(CH_2)_mCOOH$, wherein m is an integer from 14 to 40; 5-50% by weight tackifier; and 0.5-5% by weight colorant. Additionally, in some cases, the tackifier of a composition described herein comprises a rosin acid, a rosin ester, a rosin alcohol, or a mixture or combination thereof. Further, the solubility of a colorant in a composition described herein can be characterized by a spectral strength delta value of 5% or less or 3% or less.

14 Claims, No Drawings

WATER REMOVABLE COMPOSITIONS AND APPLICATIONS THEREOF

FIELD

The present disclosure relates to water removable compositions and, in particular, to water removable ink compositions for use in two-dimensional (2D) and three-dimensional (3D) printing applications.

BACKGROUND

Removable inks can be used in a variety of printing applications. There is a particular need for removable inks for printing on plastic substrates. For example, it can be desirable to print information on plastic ophthalmic lenses using a removable ink. Unfortunately, some existing removable inks have low adhesion to plastic substrates and/or must be removed from the substrate using an organic solvent. In addition, some previous removable inks cannot be reliably printed using ink jet printers. Instead, such inks can clog the ink jet print head of an ink jet printer, resulting in excessive maintenance, repair, and/or replacement of ink jet print heads. Moreover, some existing inks do not provide sufficient color contrast on a variety of plastic substrates, including transparent substrates that may be light or dark in tint.

Therefore, there exists a need for improved compositions for printing applications, including compositions that can be removed from plastic substrates in a more facile manner while also providing sufficient adhesion to a plastic substrate to resist removal of the ink during handling of the substrate.

SUMMARY

In one aspect, water dispersible or removable compositions are described herein which, in some embodiments, may offer one or more advantages over prior compositions, including for various printing applications. In some cases, for example, a composition described herein can be used as an ink for 2D printing on plastic substrates, wherein the ink provides good adhesion to the plastic substrates but is also easily removed from the substrates by rinsing with water or immersion in water. Thus, a composition described herein can be a water dispersible or water removable ink. Moreover, such an ink can be a solid ink. Further, in some cases, a composition described herein can be removed from a plastic substrate without the use of a soap or detergent. A composition described herein can also provide sufficient adhesion to a plastic substrate to permit the plastic substrate to be handled and/or packaged without excessive flaking, abrasion, or other removal of the composition from the substrate surface.

In some embodiments, a composition described herein comprises 50-95% by weight alcohol wax; 5-50% by weight tackifier; and 0.5-5% by weight colorant. In some cases, the alcohol wax has the formula $CH_3(CH_2)_nOH$, wherein n is an integer from 15 to 40. In other instances, a composition described herein comprises 50-95% by weight carboxylic acid wax; 5-50% by weight tackifier; and 0.5-5% by weight colorant. In some embodiments, the carboxylic acid wax has the formula $CH_3(CH_2)_mCOOH$, wherein m is an integer from 14 to 40. Additionally, in some cases, the alcohol or carboxylic acid wax of a composition described here can be present in the composition in an amount of 60-80% by weight, and the tackifier can be present in the composition in an amount of 10-40% by weight, based on the total weight of the composition. Moreover, in some embodiments, the tackifier of a composition described herein comprises a rosin acid, a rosin ester, a rosin alcohol, or a mixture or combination thereof. The colorant of a composition described herein can be an organic dye or an inorganic pigment. Further, in some cases, the solubility of the colorant in the composition is characterized by a spectral strength delta value of 5% or less or 3% or less. In addition, in some instances, a composition described herein further comprises up to 10% by weight inhibitor or stabilizing agent.

Moreover, in some embodiments, a composition described herein is a phase change composition, such as a composition having a melting point ranging from about 45° C. to about 90° C. Additionally, in some instances, a composition described herein is water removable and exhibits a high adhesion to one or more plastic materials.

In another aspect, methods of printing are described herein. In some embodiments, a method of printing described herein comprises selectively depositing an ink on a plastic substrate, wherein the ink comprises a composition described herein. For example, in some cases, the ink comprises 50-95% by weight alcohol wax or carboxylic acid wax; 5-50% by weight tackifier; and 0.5-5% by weight colorant. In some instances, the ink comprises an alcohol wax having the formula $CH_3(CH_2)_nOH$ or a carboxylic acid wax having the formula $CH_3(CH_2)_mCOOH$, n and m having the values recited above. Further, in some cases, the solubility of the colorant in the ink is characterized by a spectral strength delta value of 5% or less or 3% or less. In some embodiments, a method of printing described herein is a method of 2D printing. In other cases, a method of printing is a method of 3D printing.

In yet another aspect, printed substrates are described herein. In some cases, a printed substrate comprises a substrate surface described herein and a composition or ink described herein disposed on the substrate surface. Any substrate surface described hereinabove may be used. For example, in some cases, the substrate surface comprises a plastic surface. Other substrate surfaces may also be used. Similarly, any composition or ink described hereinabove may be used to provide a printed substrate described herein.

These and other embodiments are described in greater detail in the detailed description which follows.

DETAILED DESCRIPTION

Embodiments described herein can be understood more readily by reference to the following detailed description and examples. Elements, apparatus, and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "two-dimensional printing system," "two-dimensional printer," "printing," and the like generally describe various printing techniques for providing two-dimensional text or images by selective deposition of an ink, where the "two-dimensional" nature of a textual mark or image refers to the number of dimensions needed for conveying the content of the mark or image.

The terms "three-dimensional printing system," "three-dimensional printer," "printing," and the like generally describe various solid freeform fabrication techniques for making three-dimensional articles or objects by selective deposition, jetting, fused deposition modeling, multijet modeling, and other techniques now known in the art or that may be known in the future that use a build material or ink to fabricate three-dimensional objects, parts, or articles.

I. Compositions

In one aspect, compositions are described herein. In some embodiments, a composition described herein comprises, consists, or consists essentially of 50-95% by weight alcohol wax; 5-50% by weight tackifier; and 0.5-5% by weight colorant. In other instances, a composition described herein comprises, consists, or consists essentially of 50-95% by weight carboxylic acid wax; 5-50% by weight tackifier; and 0.5-5% by weight colorant. Additionally, in some cases, a composition described herein further comprises up to 10% by weight inhibitor and/or stabilizing agent.

Turning now to specific components of compositions, a composition described herein, in some embodiments, comprises an alcohol wax. Any alcohol wax not inconsistent with the objectives of the present disclosure may be used. In some cases, an alcohol wax of a composition described herein comprises a C16 to C40 alcohol, wherein a "Cn" alcohol is an alcohol having the formula ROH, wherein the R group of the alcohol comprises n carbon atoms. In some embodiments, the R group is an alkyl, alkenyl, or alkynyl group. An R group can also be an aryl, arylalkyl, or alkylaryl group. Further, in some cases, the R group of an alcohol described herein is a substituted R group. The R group can also be unsubstituted. Moreover, an alcohol described herein can be linear or branched, saturated or unsaturated. In some embodiments, an alcohol wax of a composition described herein comprises an alcohol having the formula $CH_3(CH_2)_nOH$, wherein n is an integer from 15 to 40. In some cases, n is an integer from 16 to 22. Further, an alcohol wax described herein, in some instances, comprises a fatty alcohol. Any fatty alcohol not inconsistent with the objectives of the present disclosure may be used. In some embodiments, for example, a fatty alcohol comprises hexadecanol ($C_{16}H_{33}OH$), octadecanol ($C_{18}H_{37}OH$), eicosanol ($C_{20}H_{41}OH$) or docosanol ($C_{22}H_{45}OH$), or a mixture or combination thereof. Other fatty alcohols may also be used. In addition, a composition described herein can also comprise a synthetic long chain alcohol, such as UNILIN™ 350, UNILIN™ 425, UNILIN™ 550, and/or UNILIN™ 700. Further, in some cases, an alcohol wax of a composition described herein can comprise a hydroxyl-terminated hydrophobic polymer, such as a hydroxyl-terminated polyethylene or polymethylene. In some embodiments, such a hydroxyl-terminated hydrophobic polymer can have a weight average molecular weight between about 150 and about 800 or between about 230 and about 700.

An alcohol wax described herein can be present in a composition in any amount not inconsistent with the objectives of the present disclosure. In some cases, for instance, the alcohol wax component is present in an amount of 50-95% by weight, 50-85% by weight, 60-90% by weight, 60-80% by weight, or 65-75% by weight, based on the total weight of the composition.

A composition described herein, in some embodiments, comprises a carboxylic acid wax. Any carboxylic acid wax not inconsistent with the objectives of the present disclosure may be used. In some cases, a carboxylic acid wax of a composition described herein comprises a C15 to C40 carboxylic acid, wherein a "Cn" carboxylic acid is a carboxylic acid having the formula RCOOH, wherein the R group of the carboxylic acid comprises n carbon atoms. In some embodiments, the R group is an alkyl, alkenyl, or alkynyl group. An R group can also be an aryl, arylalkyl, or alkylaryl group. Further, in some cases, the R group of a carboxylic acid described herein is a substituted R group. The R group can also be unsubstituted. Moreover, a carboxylic acid wax described herein can be linear or branched, saturated or unsaturated. In some embodiments, a carboxylic acid wax of a composition described herein comprises a carboxylic acid having the formula $CH_3(CH_2)_mCOOH$, wherein m is an integer from 14 to 40. In some cases, m is an integer from 14 to 22. For example, in some instances, a carboxylic acid described herein comprises palmitic acid, margaric acid, stearic acid, arachidic acid, behenic acid, lignoceric acid, cerotic acid, or a mixture or combination thereof. In some instances, a carboxylic acid wax of a composition described herein comprises a synthetic long chain carboxylic acid such as UNICID™ 350, UNICID™ 425, UNICID™ 550, and/or UNICID™ 700. Other carboxylic acids may also be used.

Moreover, in some embodiments, a composition described herein comprises an analogue of a carboxylic acid wax instead of or in addition to a carboxylic acid wax described herein. In some cases, for instance, a composition comprises a fatty sulfonate or phosphonate, such as a C16 to C40 or C16 to C22 alkyl sulfonate or phosphonate, wherein a "Cn" alkyl sulfonate or phosphonate refers to a sulfonate or phosphonate having an alkyl chain comprising n carbon atoms. Such an alkyl chain can be a linear alkyl chain.

A carboxylic acid wax or carboxylic acid wax analogue described herein can be present in a composition in any amount not inconsistent with the objectives of the present disclosure. In some cases, for instance, the carboxylic acid wax component is present in an amount of 50-95% by weight, 50-85% by weight, 60-90% by weight, 60-80% by weight, or 65-75% by weight, based on the total weight of the composition.

Further, an alcohol wax, carboxylic acid wax, and/or an analogue or equivalent of an alcohol wax or carboxylic acid wax described herein, in some embodiments, can be a phase change component of a composition described herein. A phase change component of a composition, in some instances, is operable to assist or accelerate the solidification of the composition when the composition is cooled to or below the freezing point of the component.

Compositions described herein also comprise a tackifier. The inclusion of a "tackifier," in some cases, can increase the adhesiveness of the composition to a substrate surface, as described further hereinbelow. Any tackifier not inconsistent with the objectives of the present disclosure may be used. In some cases, a tackifier comprises a rosin acid, a rosin ester, a rosin alcohol, or a mixture or combination thereof. Further, any rosin acid, rosin ester, or rosin alcohol not inconsistent with the objectives of the present disclosure may be used in a composition described herein.

In some embodiments, a rosin acid comprises one or more of abietic acid, neoabietic acid, dehydroabietic acid, palustric acid, pimaric acid, isopimaric acid, levopimaric acid, and sandaracopimaric acid. A rosin ester, in some cases, comprises the reaction product of an alcohol with a rosin acid, including a rosin acid described hereinabove. The alcohol, in some instances, can comprise methanol, glycerol, triethylene glycol, and/or pentaerythritol. Further, in some cases, a rosin ester is at least partially hydrogenated.

A rosin alcohol, in some embodiments, comprises the reaction product of the hydrogenation of one or more rosin acids, including rosin acids described hereinabove. Further, in some cases, a rosin alcohol comprises a primary alcohol, such as hydroabietyl alcohol.

A tackifier described herein can be present in a composition in any amount not inconsistent with the objectives of the present disclosure. In some cases, for instance, the tackifier component is present in an amount of about 5-50% by weight, 5-40% by weight, 10-50% by weight, 10-40% by weight, 10-35% by weight, 15-35% by weight, or 15-30% by weight, based on the total weight of the composition.

Additionally, a tackifier of a composition described herein can be miscible with the alcohol wax or carboxylic acid wax component of the composition, including at a temperature of 40-85° C. or 70-95° C. and a pressure of 1 atm. Materials that are "miscible" with one another can form a single phase when mixed, as opposed to forming a plurality of separate phases.

Compositions described herein further comprise a colorant. Any colorant not inconsistent with the objectives of the present disclosure may be used. In some cases, the colorant of a composition described herein can be a molecular colorant, such as a molecular dye, as opposed to a particulate colorant, such as a particulate pigment. Any molecular colorant not inconsistent with the objectives of the present disclosure may be used. In some embodiments, for example, the colorant of a composition comprises an organic dye, such as a colorant compound described in U.S. Pat. No. 6,590,082 to Banning et al. or U.S. Pat. No. 6,755,902 to Banning et al., the entireties of which are hereby incorporated by reference. In some cases, the colorant of a composition comprises a colorant having the structure of Formula (I):

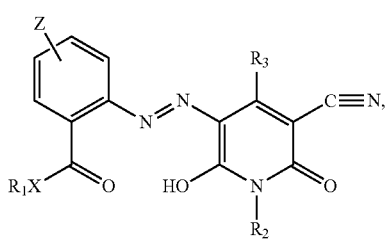

(I)

wherein
$R_1$ is (i) a C1 to C50, C8 to C50, or C12 to C40 alkyl group, which may be branched, linear, saturated, unsaturated, substituted, or unsubstituted, (ii) a C10 to C50 or C10 to C25 aryl group, (iii) a C1 to C50 arylalkyl group, (iv) a C1 to C50 alkylaryl group, (v) a C1 to C50 alkoxy group, (vi) a C1 to C50 aryloxy group, (vii) a C1 to C50 arylalkyloxy group, (viii) a C1 to C50 alkylaryloxy group, (ix) a polyalkyleneoxy group having 2 to 50 repeating C1 to C12 alkyleneoxy repeating units, (x) a polyaryleneoxy group having 2 to 50 repeating C1 to C12 aryleneoxy repeating units, (xi) a polyarylalkyleneoxy group having 2 to 50 repeating C1 to C12 arylalkyleneoxy repeating units, (xii) a polyalkylaryleneoxy group having 2 to 50 repeating C1 to C12 alkylaryleneoxy repeating units, (xiii) a heterocyclic group comprising one or more N, O, S, Si, or P heteroatoms, (xiv) a silyl group, (xv) a siloxane group, (xvi) a polysilylene group having 2 to 100 silylene repeating units, or (xvii) a polysiloxane group having 2 to 200 siloxane repeating units;

$R_2$ is (i) an alkyl group as described above for $R_1$, (ii) an aryl group as described above for $R_1$, (iii) an arylalkyl group as described above for $R_1$, (iv) an alkylaryl group as described above for $R_1$, (v) an alkoxy group as described above for (vi) an aryloxy group as described above for $R_1$, (vii) an arylalkyloxy group as described above for $R_1$, (viii) an alkylaryloxy group as described above for $R_1$, (ix) a polyalkyleneoxy group as described above for $R_1$, (x) a polyaryleneoxy group as described above for $R_1$, (xi) a polyarylalkyleneoxy group as described above for $R_1$, (xii) a polyalkylaryleneoxy group as described above for $R_1$, (xiii) a heterocyclic group as described above for $R_1$, (xiv) a silyl group as described above for $R_1$, (xv) a siloxane group as described above for $R_1$, (xvi) a polysilylene group as described above for $R_1$, (xvii) a polysiloxane group as described above for $R_1$, or (xviii) a group of Formula (II):

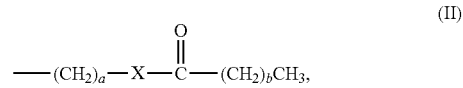

(II)

wherein
a and b are each independently integers between 1 and 100, between 1 and 50, between 1 and 25, or between 1 and 10;
$R_3$ is (i) an alkyl group as described above for $R_1$, (ii) an aryl group as described above for $R_1$, (iii) an arylalkyl group as described above for $R_1$, or (iv) an alkylaryl group as described above for $R_1$;
X is (i) a direct bond, (ii) an oxygen atom, (iii) a sulfur atom, (iv) a group of the formula —$NR_4$— wherein $R_4$ is a hydrogen atom, an alkyl group as described above for $R_1$, an aryl group as described above for $R_1$, an arylalkyl group as described above for $R_1$, or an alkylaryl group as described above for $R_1$, or (v) a group of the formula —$CR_5R_6$— wherein $R_5$ and $R_6$ are each independently a hydrogen atom, an alkyl group as described above for $R_1$, an aryl group as described above for $R_1$, an arylalkyl group as described above for $R_1$, or an alkylaryl group as described above for $R_1$; and
Z is (i) a hydrogen atom, (ii) a halogen atom, (iii) a nitro group, (iv) an alkyl group as described above for $R_1$, (v) an aryl group as described above for $R_1$, (vi) an arylalkyl group as described above for $R_1$, (vii) an alkylaryl group as described above for $R_1$, (viii) a group of the Formula (III):

(III)

wherein
$R_7$ is an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group as described above for $R_1$, (ix) a sulfonyl group of the formula —$SO_2R_8$ wherein $R_8$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group as described above for $R_1$, or (x) a phosphoryl group of the formula —$PO_3R_9$ wherein $R_9$ is a hydrogen atom, an alkyl group, an aryl group, an arylalkyl group, an alkylaryl group, an alkoxy group, an aryloxy group, an arylalkyloxy group, an alkylaryloxy group, a polyalkyleneoxy group, a polyaryleneoxy group, a polyarylalkyleneoxy group, a polyalkylaryleneoxy group, a heterocyclic group, a silyl group, a siloxane group, a polysilylene group, or a polysiloxane group as described above for $R_1$.

Additional non-limiting examples of molecular colorants suitable for use in some embodiments of a composition described herein include the NEPTUN dyes available from BASF, such as NEPTUN Blue 698, Blue 755, Yellow 075 or Yellow 078. Other dyes may also be used.

In other instances, a colorant of a composition described herein is a particulate colorant, such as a particulate pigment. In some cases, for example, the colorant of a composition comprises an inorganic pigment, such as $TiO_2$ or ZnO.

Additionally, a colorant described herein can have any color or provide any color to a composition described herein not inconsistent with the objectives of the present disclosure. In some cases, the colorant of a composition is yellow or provides a yellow color to the composition under ordinary illumination by visible white light. In other instances, the colorant is white or provides a white color to the composition. Compositions and/or colorants may have other colors as well. Moreover, in some embodiments, the color of a colorant and/or composition described herein is selected to provide a desired color contrast between the composition and a substrate surface on which the composition is disposed. The color contrast between a composition described herein and a substrate surface, in some cases, can be described as a ΔE value in the standard L*a*b* color space, where ΔE refers to the Euclidean distance between the L*a*b* color coordinates of the color of the composition and the L*a*b* color coordinates of the color of the substrate surface when viewed under illumination by white light. In some embodiments, the ΔE value is about 1 or greater or about 2 or greater when L* ranges from 0 to 100, a* ranges from −60 to +60, and b* ranges from −60 to +60. In other instances, the ΔE value is greater than about 5 or greater than about 10. The ΔE value between a composition described herein and a substrate surface can also be between about 1 and about 100, between about 1 and about 50, between about 1 and about 30, between about 1 and about 20, between about 1 and about 10, between about 2 and about 30, between about 2 and about 20, between about 2 and about 10, between about 5 and about 100, between about 5 and about 30, between about 5 and about 20, between about 5 and about 10, between about 10 and about 50, between about 10 and about 30, or between about 10 and about 20. The color of a composition described herein may also be selected to convey information, such as information related to textual, numeric, or image-based information produced using the composition, as described further hereinbelow.

A colorant described herein can be present in a composition in any amount not inconsistent with the objectives of the present disclosure. In some cases, for instance, the colorant component is present in an amount of about 0.5-5% by weight, 0.5-4% by weight, 0.5-3% by weight, 0.5-2% by weight, 1-4% by weight, 1-3% by weight, 2-5% by weight, or 2-4% by weight, based on the total weight of the composition.

Moreover, in some embodiments, the solubility of the colorant in the composition is characterized by a spectral strength delta value ($\Delta_{spec}$) of 5% or less, 3% or less, 2% or less, or 1% or less, when measured as described hereinbelow. In some cases, the composition exhibits a spectral strength delta value of about 0.1% to about 1%, about 1% to about 5%, about 1% to about 3%, about 2% to about 5%, or about 2% to about 3%. A composition exhibiting a spectral strength delta value described herein can exhibit high compositional stability and/or high color stability.

Compositions described herein, in some cases, further comprise an inhibitor and/or stabilizing agent. An inhibitor or stabilizing agent, in some cases, can prevent or inhibit the polymerization, oxidation, or other reaction or degradation of one or more components of a composition described herein. Any inhibitor or stabilizing agent not inconsistent with the objectives of the present disclosure may be used. In some instances, an inhibitor or stabilizing agent comprises one or more anti-oxidants. In some cases, for example, an inhibitor or stabilizing agent comprises an aryl compound such as butylated hydroxytoluene (BHT) or an aromatic amine type anti-oxidant such as NAUGARD® 445. In some embodiments, a polymerization inhibitor comprises methoxyhydroquinone (MEHQ). Other inhibitors or stabilizing agents may also be used.

An inhibitor or stabilizing agent can be present in a composition described herein in any amount not inconsistent with the objectives of the present disclosure. In some embodiments, an inhibitor or stabilizing agent is present in a composition in an amount up to about 10% by weight or up to about 5% by weight, based on the total weight of the composition. In some cases, an inhibitor or stabilizing agent is present in a composition in an amount ranging from about 0.1% by weight to about 10% by weight, from about 0.1% by weight to about 5% by weight, or from about 0.5% by weight to about 4% by weight, based on the total weight of the composition.

It is to be understood that the amounts and/or chemical identities of the various components of a composition described herein can be selected based on one or more desired properties of the composition. For example, in some cases, the amount and/or chemical identity of a phase change component (such as an alcohol wax described herein or a carboxylic acid wax described herein) is selected such that the composition has a melting point centered from 45° C. to 90° C. at a pressure of 1 atm. In other instances, the amount and/or chemical identity of a phase change component is selected such that the composition has a high water dispersibility or water removability and/or a high adhesion strength to a substrate surface, such as a plastic substrate surface. Such compositions, in some cases, can resist abrasion, chipping, flaking, or other removal of the composition from the substrate surface as a result of mechanical handling, shipping, and/or storage of the substrate, including under various temperature and humidity conditions and/or when the substrate surface is disposed within a container such as a paper envelope. Further, in some embodiments, the amount and/or chemical identity of a colorant described herein is selected to provide a high spectral strength value and/or a low spectral strength delta value to a composition. The amount and/or chemical identity of a colorant may also be selected to provide a high color contrast between the composition and a substrate surface on which the composition is to be disposed, including a color contrast characterized by a ΔE value described above. For example, in some cases, a colorant is selected to provide a high color contrast between the composition and a light colored or colorless substrate, such as a colorless ophthalmic lens. In other cases, a colorant can be selected to provide a high color contrast between the composition and a dark colored substrate, such as a dark or black ophthalmic lens. A colorant may also be selected to provide a high color contrast between a composition and both light and dark colored substrates.

As described above, a composition described herein, in some cases, can be an ink. A composition described herein can also be a phase change composition or a phase change ink. A phase change composition or ink, in some embodiments, has a sharp freezing point or a freezing point over a narrow range of temperatures. In some cases, for instance, a phase change composition freezes or solidifies over a temperature range of about 1° C. to about 5° C. or about 1° C. to about 3° C. In some embodiments, a phase change composition having a sharp freezing point freezes or solidifies over a temperature range of X±0.5° C., where X is the temperature at which the freezing point is centered (e.g., X=45° C.).

In addition, a composition described herein can have a melting point or freezing point consistent with the temperature parameters of one or more 2D printing systems or 3D printing systems. In some cases, a composition has a melting point ranging from about 45° C. to about 95° C., from about 45° C. to about 70° C., from about 50° C. to about 85° C., from about 55° C. to about 80° C., from about 60° C. to about 85° C., or from about 65° C. to about 80° C. Moreover, in some embodiments, a composition described herein has a freezing point ranging from about 40° C. to about 85° C., from about 45° C. to about 75° C., from about 45° C. to about 65° C., from about 45° C. to about 55° C., or from about 50° C. to about 70° C.

Further, in some cases, a composition described herein is a "solid" ink. A "solid" ink, as understood by one of ordinary skill in the art, can be in the form of a solid stick or other non-particulate form at standard temperature and pressure (STP) conditions, as opposed to being in the form of a fluid ink or toner powder. Such a stick of solid ink, in some embodiments, can be loaded into a printer, melted, and then used to produce images on a substrate surface.

Moreover, in some cases, a composition described herein is non-curable or does not polymerize or substantially polymerize when irradiated with electromagnetic radiation used in free radical polymerizations. In some instances, a composition described herein does not comprise a chemical species having one or more ethylenically unsaturated moieties, such as one or more acrylate, methacrylate, or vinyl species. In some embodiments, such a chemical species is present in a composition described herein in an amount of no greater than about 5% by weight, no greater than about 1% by weight, no greater than about 0.5% by weight, or no greater than about 0.1% by weight, based on the total weight of the composition.

In addition, in some cases, a composition or ink described herein can be water dispersible, water soluble, or water removable. A "water removable" composition or ink, in some instances, can be completely or substantially completely removed from a substrate surface when the composition and/or substrate surface are immersed in water and/or otherwise treated with water or an aqueous solution, such as by spraying, wiping, and/or exposing the composition and/or substrate surface to a flow of water or aqueous solution. A composition that is "substantially completely removed," in some embodiments, is removed from the substrate surface in an amount of at least about 80% by weight, at least about 90% by weight, at least about 95% by weight, or at least about 99% by weight, based on the total weight of the composition originally present on the substrate surface. Moreover, in some embodiments, the water or aqueous solution used to remove a composition described herein can be at a temperature of 20-30° C., such as a temperature of 25° C.

Moreover, in some cases, a composition described herein is self-emulsifying when contacted with water or a continuous aqueous phase. Additionally, in some cases, an aqueous dispersion of a composition described herein can be directly disposed of in a wastewater treatment system without further chemical and/or physical processing prior to entry into the wastewater treatment system. In some instances, for example, an aqueous dispersion of a composition described herein can be disposed of in a municipal wastewater treatment system without further chemical and/or physical processing or treatment prior to entry into the municipal wastewater treatment system. Additionally, in some cases, a composition described herein is biodegradable.

A composition described herein can also exhibit a high adhesion to various substrates, including various plastic substrates. In some instances, a composition described herein exhibits a high adhesion or adhesive strength to a substrate formed from one or more of polycarbonate, a urethane polymer or oligomer such as TRIVEX (available from PPG Industries), a thiourethane polymer or oligomer such as a high refractive index thiourethane plastic, and allyl diglycol carbonate (ADC or CR-39). A composition described herein may also exhibit high adhesion to other plastic substrates such as polyethylene, polypropylene, polyvinylchloride, polyethylene terephthalate, polystyrene, polyesters, or polyamides. Moreover, in some cases, a composition described herein exhibits a high adhesion to non-plastic substrates such as glass.

Further, in some instances, a composition described herein has a viscosity consistent with the requirements and parameters of one or more 2D or 3D printing systems. In some cases, for example, a composition described herein has a dynamic viscosity ranging from about 9.0 centipoise (cP) to about 14.0 cP at a temperature from about 60 to 130° C., when measured according to ASTM standard D2983 (e.g., using a Brookfield Model DV-II+Viscometer). In some embodiments, a composition has a viscosity ranging from about 9.5 cP to about 12.0 cP or from about 10.0 cP to 11.0 cP at a temperature from about 60 to 130° C. In other cases, a composition described herein has a viscosity ranging from about 10.0 cP to about 19.0 cP, from about 11.0 cP to about 14.0 cP, from about 11.5 cP to about 13.5 cP, or from about 12.0 cP to about 13.0 cP at a temperature from about 70 to 100° C.

Compositions described herein can be made in any manner not inconsistent with the objectives of the present disclosure. In some cases, for instance, a method for the preparation of a composition described herein comprises the steps of mixing and melting the components of the composition and filtering the molten mixture. Melting the mixture, in some embodiments, is carried out at a temperature from about 40° C. to about 120° C., such as 100-110° C. In some cases, a composition described herein is produced by placing all components of the composition except the colorant in a reaction vessel and heating the resulting mixture to a temperature ranging from about 40° C. to about 120° C., with or without stirring. The colorant can then be added to the mixture and the mixture can be stirred. Heating and stirring can be continued until the mixture attains a substantially homogenized molten state. In general, the molten mixture can then be filtered while in a flowable state to remove any large undesirable particles that may interfere with jetting or other deposition of the composition. The filtered mixture can then be cooled to ambient temperatures until it is heated in a printer, such as a 2D or 3D printer.

II. Methods of Printing

In another aspect, methods of printing are described herein. In some embodiments, a method described herein comprises selectively depositing an ink on a plastic substrate, wherein the ink comprises a composition described herein. Any composition described hereinabove in Section I may be used. For example, in some cases, the ink comprises 50-95% by weight alcohol wax or carboxylic acid wax; 5-50% by weight tackifier; and 0.5-5% by weight colorant. In some instances, the ink comprises an alcohol wax having the formula $CH_3(CH_2)_nOH$ or a carboxylic acid wax having the formula $CH_3(CH_2)_mCOOH$, n and m having the values recited above. Further, in some cases, the solubility of the colorant in the ink is characterized by a spectral strength delta value of 5% or less or 3% or less. In some embodiments, the printing of a method described herein is 2D printing. In other cases, the printing is 3D printing.

Moreover, the plastic substrate can be any plastic substrate not inconsistent with the objectives of the present disclosure. In some cases, the plastic substrate is formed from one or more of polycarbonate, a urethane polymer or oligomer such as TRIVEX (available from PPG Industries), a thiourethane polymer or oligomer such as a high refractive index thiourethane plastic, and allyl diglycol carbonate (ADC or CR-39). The plastic substrate may also be formed from polyethylene, polypropylene, polyvinylchloride, polyethylene terephthalate, polystyrene, polyesters, and/or or polyamides. Moreover, in some instances, the plastic substrate is a plastic ophthalmic lens, such as a lens for eyeglasses or a contact lens. Further, in some embodiments, the lens can be a semi-finished lens such as an unground and/or unpolished lens, as opposed to a finished lens. In addition, in some cases, a lens described herein is a light colored lens or a colorless lens. In other instances, a lens can be a dark colored lens such as a black, brown, or blue colored lens.

Thus, in some embodiments, a method of printing described herein is a method of printing markings onto an ophthalmic lens as part of a lens production and/or processing chain. In some such cases, printing can be carried out using a digital printer such as the Digital Lens Inker available from Automation & Robotics. Other 2D or 3D printers or printing systems may also be used in a method described herein.

In some cases, a preselected amount of an ink described herein is heated to an appropriate temperature and jetted through the print head or a plurality of print heads of a suitable 2D or 3D printer, such as an ink jet, to form one or more layers of the ink on the substrate surface. The ink can be deposited according to preselected computer assisted design (CAD) or other parameters to provide a desired alphanumeric marking or other marking. A suitable print head to deposit the ink, in one embodiment, is the piezoelectric Z850 print head. Additional suitable print heads for the deposition of inks described herein are commercially available from a variety of ink jet printing apparatus manufacturers. For example, a Xerox print head or Ricoh print heads may also be used. Further, in some embodiments, the temperature of the substrate surface can be controlled so that the jetted droplets of ink solidify on contact with the substrate surface or shortly thereafter.

Moreover, it is also possible to use an ink described herein to produce a 3D article, in addition to or instead of using the ink to form a 2D marking on a substrate surface. In such cases, a plurality of layers of the ink can be deposited sequentially. As understood by one of ordinary skill in the art, the layers can be deposited according to preselected CAD parameters such that the sequentially stacked layers form a 3D article or object. Additionally, in some instances, the deposited ink is also subjected to planarization in a layer by layer manner. Layered deposition of the ink, with or without planarization, can be repeated until the 3D article has been formed.

Additionally, in some embodiments, a method of printing described herein further comprises removing the ink from the substrate surface. As inks described herein can be water removable and/or at least partially water removable, removing the ink, in some embodiments, comprises at least partially dispersing or removing the ink with water. Dispersing or removing the ink with water, in some cases, comprises contacting the ink with flowing water. In other instances, dispersing or removing the ink with water comprises at least partially immersing the substrate in a water bath. In some embodiments, the water bath is stirred, or sonicated, or otherwise agitated during immersion of the substrate. Further, water used for the removal of an ink can be at any desired temperature not inconsistent with the objectives of the present disclosure. In some embodiments, water for the removal of the ink can be heated to any temperature that does not deform or substantially deform or compromise the structure of the substrate surface. In some embodiments, for example, water for removal of the ink is heated to a temperature ranging from about 40° C. to about 70° C. Alternatively, in other cases, it is not necessary to heat the water used for removal of the ink. In some embodiments, for instance, the water for the removal of the ink is at a temperature at or near room temperature, such as a temperature ranging from about 20° C. to about 35° C. or about 20° C. to about 30° C.

In addition, in some cases, one or more surfactants or detergents can be added to water used to remove the ink. Alternatively, in other embodiments, no surfactants or detergents are intentionally added to the water.

III. Printed Substrates

In another aspect, printed substrates are described herein. In some embodiments, a printed substrate comprises a substrate surface described herein and a composition or ink described herein disposed on and/or adhered to the substrate surface. Any substrate surface described hereinabove in Section II may be used. For example, in some cases, the substrate surface comprises a surface of an ophthalmic lens formed from a plastic such as polycarbonate. Other substrate surfaces may also be used. Similarly, any composition or ink described hereinabove in Section I or Section II may be used to provide a printed substrate described herein. In some cases, for instance, the ink comprises 50-95% by weight alcohol wax or carboxylic acid wax; 5-50% by weight tackifier; and 0.5-5% by weight colorant. In some instances, the ink comprises an alcohol wax having the formula $CH_3(CH_2)_nOH$ or a carboxylic acid wax having the formula $CH_3(CH_2)_m COOH$, n and m having the values recited above. Further, in some cases, the solubility of the colorant in the ink is characterized by a spectral strength delta value of 5% or less or 3% or less.

Some embodiments described herein are further illustrated in the following non-limiting examples.

EXAMPLES

Compositions or Inks

Compositions or inks according to some embodiments described herein were prepared as follows. Specifically, Inks 1 through 18 in Tables I and II below were prepared by charging all of the components of each composition except the colorant into a beaker or glass jar, followed by melting of the components at 100-110° C. in an oven. The colorant was then added to the melted mixture, and the mixture was stirred for about 1 hour while maintaining the mixture in an oil bath at 100-110° C. Next, an aliquot (of approximately 2 g) was removed from the mixture for a spectral strength measurement, as described further hereinbelow. The remaining portion of the mixture was filtered through a heated MOTT apparatus (Mott Metallurgical) including a stainless steel filter holder equipped with Whatman #3 filter paper. Filtration was carried out at a pressure of about 15 pounds per square inch and a temperature above the melting point of the mixture. The filtered mixture was then cast into aluminum pans and cooled to provide a filtered solid ink composition. All amounts in Tables I and II are weights of the identified components in grams (g).

TABLE I

Ink Compositions.

| | Components | | | | | |
|---|---|---|---|---|---|---|
| Ink | Stearic acid | Behenic acid | Rosin acid[1] | Rosin ester[2] | Colorant[3] | Antioxidant[4] |
| 1 | 68.60 | | 29.40 | | 1.82 | 0.18 |
| 2 | 68.60 | | | 29.40 | 1.82 | 0.18 |
| 3 | 68.60 | | 14.70 | 14.70 | 1.82 | 0.18 |
| 4 | | 68.60 | 29.40 | | 1.82 | 0.18 |
| 5 | | 68.60 | | 29.40 | 1.82 | 0.18 |
| 6 | | 68.60 | 14.70 | 14.70 | 1.82 | 0.18 |
| 7 | 68.82 | | 29.50 | | 1.50 | 0.18 |
| 8 | 68.82 | | | 29.50 | 1.50 | 0.18 |
| 9 | 68.82 | | 14.75 | 14.75 | 1.50 | 0.18 |
| 10 | | 68.82 | 29.50 | | 1.50 | 0.18 |
| 11 | | 68.82 | | 29.50 | 1.50 | 0.18 |
| 12 | | 68.82 | 14.75 | 14.75 | 1.50 | 0.18 |

[1]Provided under the trade name KR610 from Arakawa Chemical.
[2]Provided under the trade name KE100 from Arakawa Chemical.
[3]Provided according to Formula (I) above for Inks 1-6 and 13-15; provided under the trade name NEPTUN Yellow 075 (SY162) from BASF for Inks 7-12 and 16-18.
[4]Provided under the trade name NAUGARD ® N445 from Chemtura.

TABLE II

Ink Compositions.

| | Components | | | | |
|---|---|---|---|---|---|
| Ink | Stearyl alcohol | Behenyl alcohol | Rosin ester[2] | Colorant[3] | Inhibitor[5] |
| 13 | 66.29 | | 29.95 | 1.82 | 1.94 |
| 14 | | 66.29 | 29.95 | 1.82 | 1.94 |
| 15 | 33.15 | 33.15 | 29.95 | 1.82 | 1.94 |
| 16 | 66.51 | | 30.05 | 1.50 | 1.94 |
| 17 | | 66.51 | 30.05 | 1.50 | 1.94 |
| 18 | 33.26 | 33.26 | 30.05 | 1.50 | 1.94 |

Table III provides some properties of Inks 1-18. Double hypens "--" in Table III indicate that the identified value was not measured for a specific ink. Viscosities in Table III are dynamic viscosities measured using an AR-1000 cone and plate rheometer at 110° C. (stainless steel cone with a cone angle of 1.97°, a cone diameter of 40 mm, and a truncation gap of 45 μm) according to the manufacturer's protocol (as described in "AR 500/1000 Rheometers: Rheometrics Series Getting Started Guide," PN 500017.001 Rev. G, Issued October 2006, TA). However, inks described herein generally exhibited viscosities ranging from about 3 cP to about 30 cP at a temperature between about 80° C. and about 130° C., or from about 5 cP to about 20 cP at a temperature between about 90° C. and about 115° C. "DSC" in Table III refers to Differential Scanning calorimetry. Peak melting point and peak freezing point were measured by DSC using a DUPONT 2100 calorimeter. For Inks 1-6 and 13-15, the $\Delta_{spec}$ values in Table III were measured in toluene. For Inks 7-12 and 16-18, the $\Delta_{spec}$ values were measured in butanol. In general, $\Delta_{spec}$ values were calculated according to the following equation:

$$\Delta_{spec}=[|(SS_{unfiltered}-SS_{filtered})|/(\text{larger of } SS_{unfiltered} \text{ and } SS_{filtered})]\times 100\%,$$

wherein $SS_{unfiltered}$ is the spectral strength of the unfiltered ink aliquot described above; and $SS_{filtered}$ is the spectral strength of the filtered ink described above. The spectral strength of the unfiltered and filtered inks was measured by dissolving the ink in a solvent (such as toluene or butanol) and measuring the absorbance of the ink solution at a given wavelength (such as 580 nm) using a Perkin Elmer Lambda 2S UV/vis spectrophotometer. The spectral strength was taken to be equal to the measured absorbance (A) divided by the concentration of the ink in the solution in g/mL. For example, for 167.96 mg ink dissolved in 250 mL butanol, an absorbance at 580 nm of 0.7634 (arbitrary units) was measured, providing a spectral strength value of 1136. For calculation of $\Delta_{spec}$, equal weights of filtered and unfiltered aliquots of an ink were dissolved in equal volumes of the same solvent.

TABLE III

Ink Properties.

| Ink | Viscosity at 110° C. (cP) | Peak Melting Point by DSC (° C.) | Peak Freezing Point by DSC (° C.) | $\Delta_{spec}$ (%) |
|---|---|---|---|---|
| 1 | 6.88 | 65.42 | 56.73 | 0.9 |
| 2 | 7.96 | 68.66 | 61.87 | 0.5 |
| 3 | — | 66.89 | 59.25 | — |
| 4 | 8.94 | 74.93 | 66.53 | 0.2 |
| 5 | 10.32 | 78.02 | 71.22 | 0.9 |
| 6 | — | 76.63 | 68.44 | — |
| 7 | 6.96 | 65.53 | 56.02 | 0 |
| 8 | 8.03 | 69.47 | 60.77 | <0.1 |
| 9 | 7.49 | 67.36 | 59.29 | — |
| 10 | 9.19 | 75.31 | 66.98 | 0.2 |
| 11 | 10.53 | 79.86 | 70.74 | 0 |
| 12 | 9.79 | 76.58 | 67.77 | — |

TABLE III-continued

Ink Properties.

| Ink | Viscosity at 110° C. (cP) | Peak Melting Point by DSC (° C.) | Peak Freezing Point by DSC (° C.) | $\Delta_{spec}$ (%) |
|---|---|---|---|---|
| 13 | 4.72 | 70.94 | 64.14 | 2 |
| 14 | 6.12 | 58.29 | 49.58 | 0.9 |
| 15 | — | 40.65, 58.14 | 30.21, 51.99 | — |
| 16 | 4.81 | 57.84 | 50.07 | 0.2 |
| 17 | 6.23 | 71.55 | 62.87 | <0.1 |
| 18 | 5.44 | 40.9, 58.5 | 29.9, 51.5 | — |

In addition to the properties provided in Table III, adhesion values were measured for some of Inks 1-18. Specifically, adhesion of an ink to a polycarbonate substrate surface was evaluated by dropping an aliquot of the liquid ink at 110° C. onto a polycarbonate sheet with a glass pipet to form 5-7 dots of ink having a diameter of about 5 mm each. Following solidification of the dots of ink, adhesion to the substrate was evaluated by pushing or scratching the dots with a fingernail. Inks 1, 2, 4, 5, 7, 9, 10, 12, 13, 14, 16, 17, and 18 exhibited an adhesion value of 80-100%, where the adhesion value refers to the percentage of dots that were not removed by fingernail scratching.

The removability of some inks described herein by an organic solvent and by water was also evaluated. Dispersibility or removability of the inks by an organic solvent was evaluated by depositing drops of an ink onto a polycarbonate substrate as described above. Next, isopropyl alcohol (IPA) was sprayed onto the substrate surface. The IPA and the dots of ink were then removed by wiping the substrate surface with a cloth. The spraying/wiping cycle was repeated until all of the dots were removed or until 8 cycles had been completed. The removability of the ink was evaluated on a scale of 1 to 10, where 1 corresponded to the most facile removal and 10 corresponded to the most difficult removal. For example, a score of 1 was assigned when 80-100% of the ink was removed after only 1 cycle of spraying and wiping. A score of 6 was assigned when about 1-3% of the ink remained as residual marks on the substrate after 8 cycles. A score of 10 was assigned when at least 15% of the ink remained on the substrate after 8 cycles. Water removability of the inks was evaluated in a similar manner, except running water was used instead of sprayed IPA. Both the IPA and the water were used at a temperature of about 25° C. The results are shown in Table IV.

TABLE IV

Ink Properties.

| Ink | IPA Removal Score | Water Removal Score |
|---|---|---|
| 7 | 10 | 3 |
| 8 | 5 | 5 |
| 9 | 3 | 7 |
| 10 | 4 | 9 |
| 11 | 2 | 4 |
| 12 | 2 | 8 |
| 16 | 3 | 6 |
| 17 | 1 | 1 |
| 18 | 6 | 2 |

In addition to the inks shown in Table IV, the removability of other inks was evaluated as well. Inks 2, 4, 5, 13, and 14 were readily removed with IPA, and Inks 2, 5, 13, and 14 were readily removed with water.

All patent documents referred to herein are incorporated by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

That which is claimed:

1. A composition comprising:
    50-95% by weight alcohol wax;
    5-50% by weight tackifier; and
    0.5-5% by weight colorant,
   wherein the solubility of the colorant in the composition is characterized by a spectral strength delta value of 5% or less.

2. The composition of claim 1, wherein the alcohol wax comprises an alcohol having the formula $CH_3(CH_2)_nOH$, wherein n is an integer from 15 to 40.

3. The composition of claim 1, wherein the alcohol wax is present in the composition in an amount of 60-80% by weight, based on the total weight of the composition.

4. The composition of claim 1, wherein the tackifier comprises a rosin acid, a rosin ester, a rosin alcohol, or a mixture or combination thereof.

5. The composition of claim 1, wherein the tackifier is present in the composition in an amount of 10-40% by weight, based on the total weight of the composition.

6. The composition of claim 1, wherein the colorant comprises an organic dye.

7. The composition of claim 1 further comprising up to 10% by weight inhibitor or stabilizing agent.

8. The composition of claim 1, wherein the composition has a melting point ranging from about 45° C. to about 80° C.

9. The composition of claim 1, wherein the composition is water removable from a plastic substrate surface.

10. A method of printing comprising depositing an ink on a plastic substrate, wherein the ink comprises:
    50-95% by weight alcohol wax;
    5-50% by weight tackifier; and
    0.5-5% by weight colorant,
   wherein the alcohol wax comprises an alcohol having the formula $CH_3(CH_2)_nOH$, wherein n is an integer from 15 to 40, and wherein the solubility of the colorant in the ink is characterized by a spectral strength delta value of 5% or less.

11. The method of claim 10, wherein printing is two-dimensional printing.

12. The composition of claim 1, wherein the tackifier is present in the composition in an amount of 25-35% by weight, based on the total weight of the composition.

13. The composition of claim 1, wherein the alcohol wax comprises an alcohol having the formula $CH_3(CH_2)_nOH$, wherein n is an integer from 16 to 22.

14. The composition of claim 1, wherein:
    the alcohol wax comprises an alcohol having the formula $CH_3(CH_2)_nOH$, wherein n is an integer from 16 to 22;
    the alcohol wax is present in the composition in an amount of 60-80% by weight, based on the total weight of the composition;
    the tackifier comprises a rosin acid, a rosin ester, a rosin alcohol, or a mixture or combination thereof;

the tackifier is present in the composition in an amount of 25-40% by weight, based on the total weight of the composition;
the colorant comprises an organic dye; and
the composition has a melting point ranging from 45° C. to 80° C.

* * * * *